Aug. 3, 1965 J. A. CENCEL 3,198,021
PRECISION GYROSCOPE
Filed June 7, 1961 3 Sheets-Sheet 1
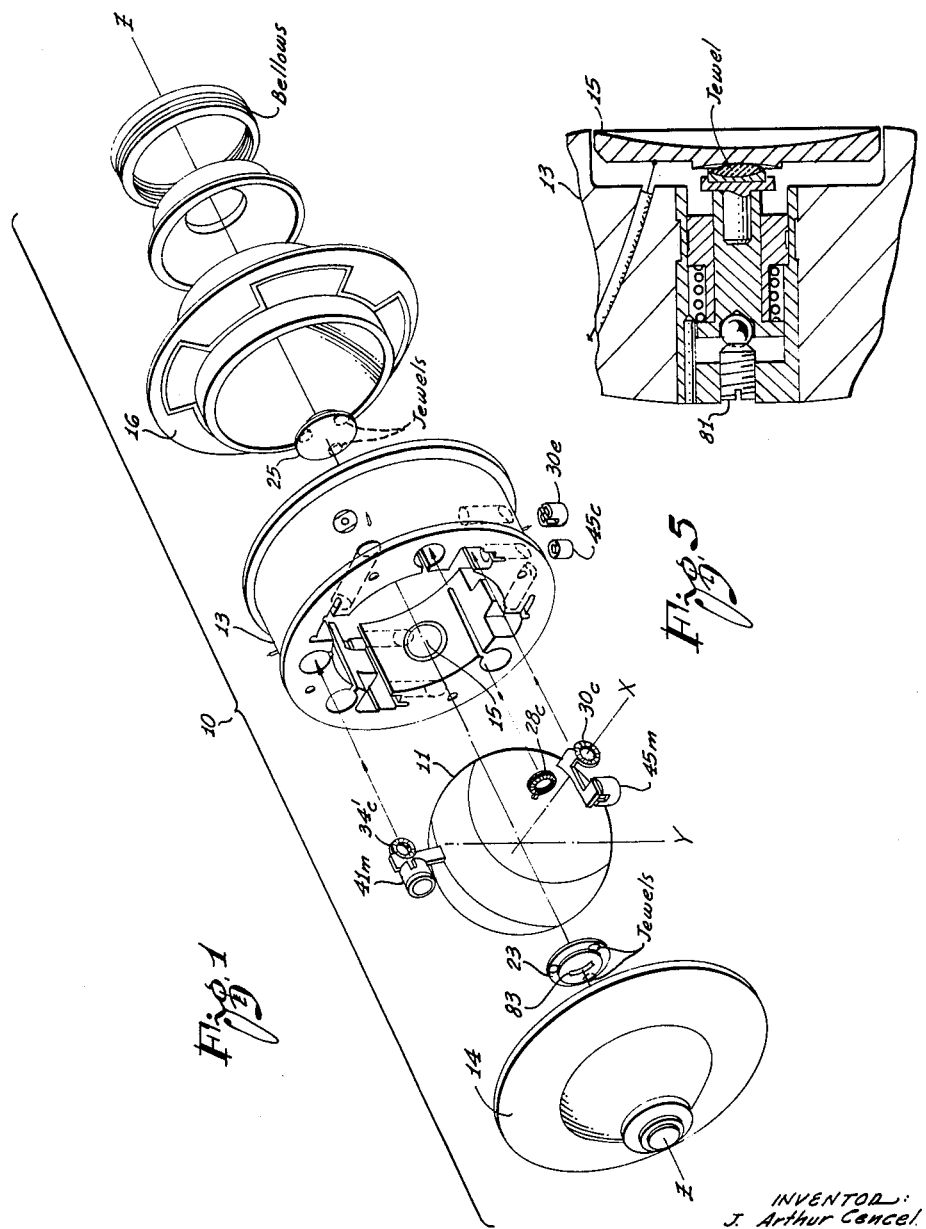
INVENTOR:
J. Arthur Cencel
By Richard K. Ehrlich
Attorney

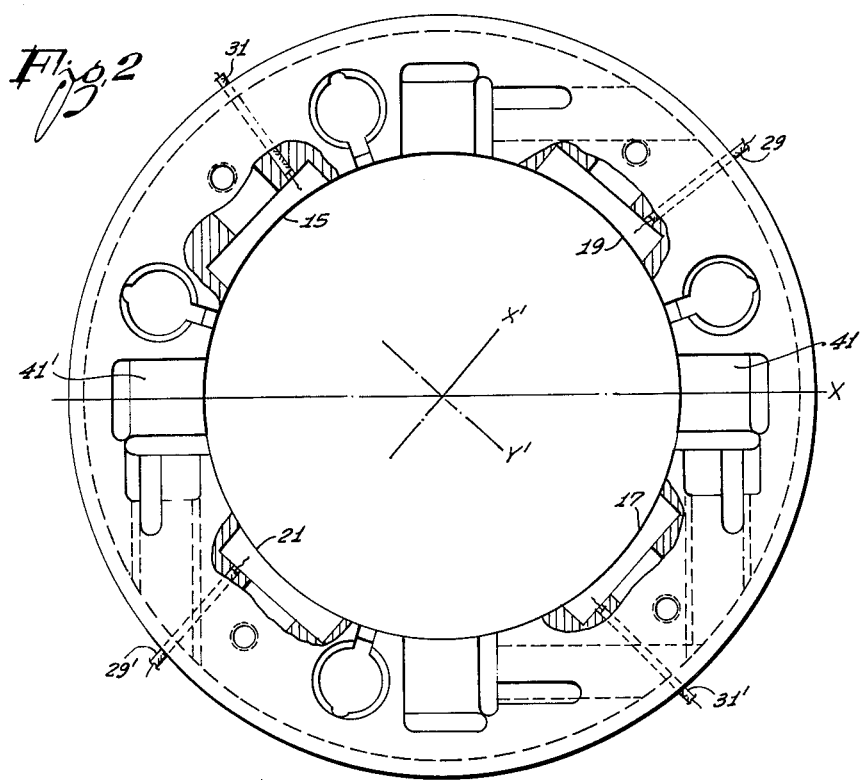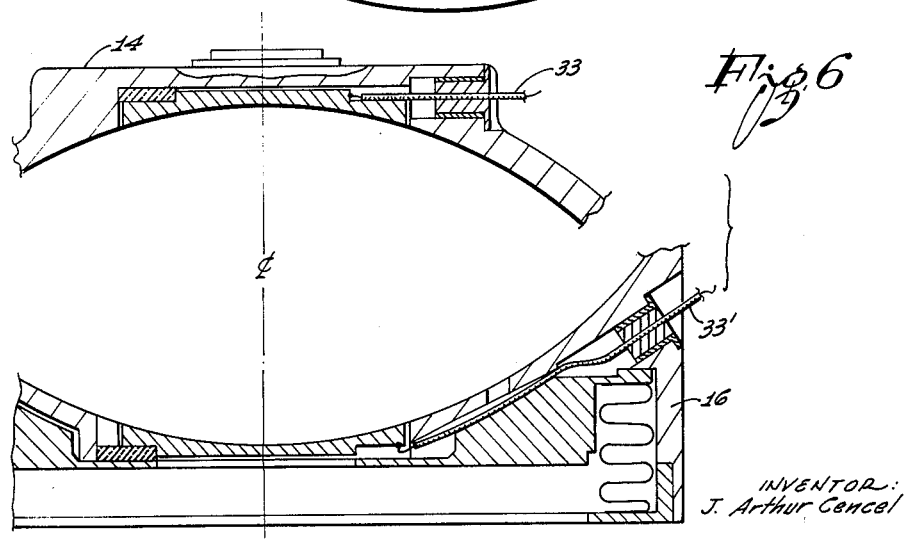

Aug. 3, 1965
J. A. CENCEL
3,198,021
PRECISION GYROSCOPE
Filed June 7, 1961
3 Sheets-Sheet 3
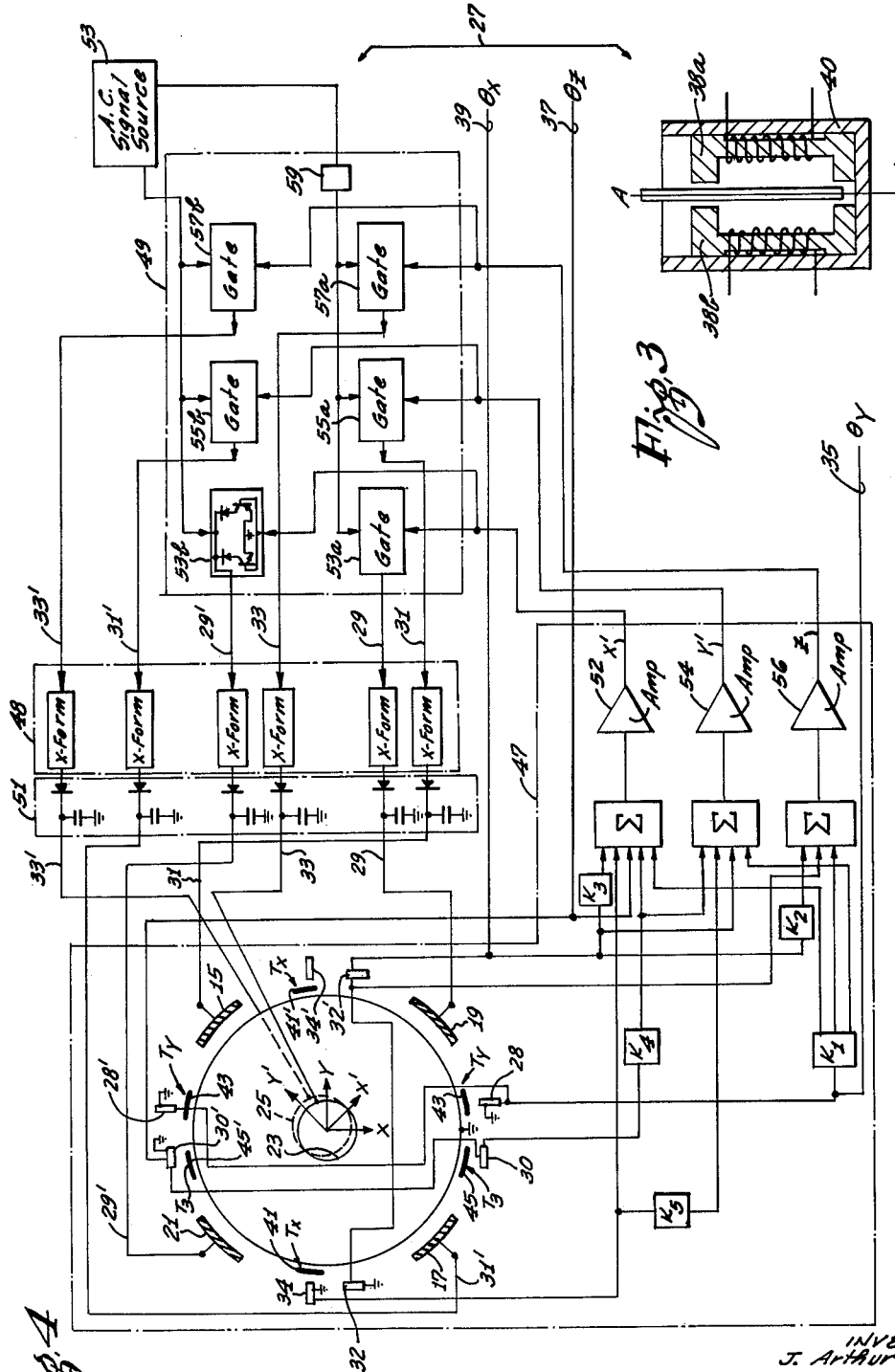
INVENTOR:
J. Arthur Cencel
By Richard K. Ehrlich
Attorney United States Patent Office 3,198,021
Patented Aug. 3, 1965

3,198,021
PRECISION GYROSCOPE
Joseph Arthur Cencel, Los Angeles, Calif., assignor to Litton Systems, Inc., Beverly Hills, Calif.
Filed June 7, 1961, Ser. No. 115,379
12 Claims. (Cl. 74—5)

The present invention relates to a floated gyroscope and more particularly to a floated gyroscope having an electrostatically positioned floated element.

In recent years, there has arisen a need for ultra accurate gyro instruments due to the use of inertial autonavigators in guidance systems for controlling the flight of airborne vehicles. In attempting to fabricate truly ultra accuracy gyros, it was learned at an early date that the bearings utilized to rotatably connect the gyro element to its gimbals were an inherent source of gyro error. More particularly, the bearings introduce bearing error torques which substantially limit the accuracy of the gyro devices. In addition, the gimbals are themselves an inherent source of error in that it is impossible to fabricate a gimbal with sufficient accuracy to insure that the axes defined by the gimbals are aligned with the desired axial directions. Furthermore, the gimbals, like all mechanical pieces, are subject to dimensional variations with temperature so that it is impossible to maintain high accuracy gimbal dimensional stability.

In order to overcome the inherent accuracy limitations of gimbaled gyros, it was recognized that if the gyro rotor element could be levitated and centered by electrostatic means, the use of gimbals and their accompanying bearings could be done away with. In this regard, considerable effort has been directed toward the development and fabrication of an electrostatically supported gyro. However, such efforts have generally been frustrated due to the fact that the magnitude of electrostatic forces required to levitate a gyro rotor-and-motor element has been beyond that possible with apparatus capable of being incorporated into a gyroscope device.

In an effort to at least reduce somewhat the inaccuracy involved in the use of gimbals and gimbal bearings, a floated gyroscope has been developed in the prior art which allows the use of small size precision jewel-and-pivot bearings which serve essentially as loadless guides for guiding the rotor-and-motor assembly with respect to the gimbal rather than to support as well as guide the assembly. More particularly, the gyro rotor-and-motor assembly is emerged in a flotation fluid having substantially the same density as the average density of the rotor-and-motor assembly so that the assembly is floated in weightless fashion whereby the jewel-and-pivot bearings are not required to support the weight of the assembly.

While floated gyroscopes utilizing precision jewel-and-pivot bearings permit accuracies far greater than conventional non-floated gyros, they still suffer from the inherent accuracy limitations involved in the use of gimbals as well as with bearing error torques which, while they are not as great as those involved in non-floated gyroscopes, are still substantial. More specifically, substantial error torque is generated by bearing friction resulting from the inability of the bearing to completely isolate the floated element from the gimbal. In addition, foreign matter carried by the flotation fluid tends to accumulate in the jewel apertures whereby a sticky mass is produced which impedes the operation of the bearings and results in low gyro sensitivity. Furthermore, substantial inaccuracy is introduced into the gyro operation as a result of bearing play which affects the linearity of the gyro system.

The present invention, on the other hand, overcomes the foregoing enumerated and other limitations of the prior art gyroscope devices by providing a no gimbal floated gyroscope wherein the gyro floated element is partly supported and maintained centered by means of electrostatic forces. More particularly, the gyro floated element is substantially floated in a flotation fluid whereby the floated element is substantially weightless. Accordingly, relatively low magnitude electrostatic forces can be utilized to support and orient the floated element.

In accordance with one embodiment of the invention, a plurality of four pairs of pick-off elements positioned around the floated element sense angular and translational deviation of the floated element from its null position and selectively actuate a plurality of three pairs of electrostatic plates connected to the gyroscope housing which exert translational forces on the floated element to return the element to its null position. Detection of angular deviation by the pick-off devices selectively actuates three pairs of torquer elements positioned about the floated element in such a manner that pure rotational torques are applied to the floated element along three mutually orthogonal axes to maintain the floated element in the null position. Accordingly, the floated rotor-and-motor assembly is maintained properly aligned without gimbal and gimbal bearing structure so that the accuracy of the gyroscope is not limited by the inherent inaccuracy of such structure.

It is, therefore, an object of the invention to provide a floated gyroscope having an electrostatically centered floated element.

Another object of the invention is to provide a precision gyro wherein bearing error torques are eliminated by partly supporting and by centering a floated rotor-and-motor assembly by electrostatic means.

A further object of the invention is to provide a gimbal less electrostatically centered floated gyroscope having no bearing error torques and which is easily assembled and disassembled.

The novel features which are believed to be characteristic of the invention, both as to its organization and method of operation, together with further objects and advantages thereof, will be better understood from the following description considered in connection with the accompanying drawings in which one embodiment of the invention is illustrated by way of example. It is to be expressly understood, however, that the drawings are for the purpose of illustration and description only, and are not intended as a definition of the limits of the invention.

FIG. 1 is an isometric exploded view of a floated gyroscope of the invention;

FIG. 2 is a side view of the case of the gyroscope of FIG. 1;

FIG. 3 is a side cross-sectional view of an exciter coil assembly suitable for use in the present invention;

FIG. 4 is a schematic view of electrical circuitry suitable for use in the present invention;

FIG. 5 is a cross-sectional fragmentary view of a portion of the outer case of the gyroscope of FIG. 1; and FIG. 6 is a fragmentary cross-sectional view of two electrostatic pads depicting the manner of mounting the pads to the gyroscope outer case.

Referring now to the drawings wherein like or corresponding parts are referred to by the same reference characters, there is shown in FIG. 1, an isometric exploded view of a floated gyroscope 10 having an electrostatically positioned rotor-and-motor assembly 11 and an XYZ coordinate system superimposed thereon. More particularly, rotor-and-motor assembly 11 is floated within a gyro housing made up of a center casing 13, a top cover 14 and a bottom cover 16 by a flotation fluid whose density is such that the rotor-and-motor assembly is near weightlessness. In accordance with the invention, the near weightless rotor-and-motor assembly 11 is centered within casing 13 by means of a pair of diametrically positioned electrostatic plates or pads 15 and 17, a similarly positioned pair of pads 19 and 21 and a pair of electrostatic pads 23 and 25 diametrically positioned along the Z axis on the gyro top cover 14 and bottom 16, respectively.

In order to better appreciate the placement of the electrostatic pads 15–21, attention is directed to FIG. 2 wherein there is shown a side view of case 13 relative to the XYZ coordinate system and an X'Y'Z coordinate system which is displaced 45° in the XY plane with respect to the XYZ system. As is indicated in FIG. 2, pads 15 and 17 are centered along the Y' axis so that if the outer case of rotor-and-motor assembly 11 is maintained at some predetermined potential, such as ground potential, the assembly can be accurately positioned along the Y' axis by the application of a preselected D.C. voltage 31 to either plate 15 or 17 over a pair of conductors 31 and 31', respectively. In addition, pads 19 and 21 are centered along the X' axis so that assembly 11 can be accurately positioned along the X' axis by similarly applying a preselected D.C. voltage 29 to either plate 19 or 21 over a pair of conductors 29 and 29, respectively. Accordingly, rotor-and-motor assembly 11 can be accurately positioned within the gyro housing in the XY plane through the action of electrotatic pads 15, 17, 19, and 21.

Referring again to FIG. 1, as has been mentioned, plates 23 and 25 are positioned on opposite sides of the rotor-and-motor assembly 11 and concentric with respect to the Z axis. Accordingly, by applying a preselected D.C. voltage 33 to either plate 23 or 25 over a pair of conductors 33 and 33', respectively, assembly 11 can be positioned or centered along the Z axis. Hence, by the application of preselected voltages 29, 31, and 33 to the electrostatic plates, the rotor-and-motor assembly can be accurately centered within the gyro housing. In this regard, it should be noted that in contrast with prior art devices, the voltages needed to center the rotor-and-motor assembly are relatively small since, due to the operation of the flotation fluid, rotor-and-motor assembly 11 has substantially no weight.

As has been heretofore mentioned, the rotor-and-motor assembly is centered by applying the preselected voltage signals to the electrostatic plates or pads. The magnitude and polarity of the voltages of the preselected signals are determined in accordance with the deviation of the rotor-and-motor assembly from its null or centered position. In this regard, as indicated in FIGS. 1 and 2, casing 13 of the gyroscope is provided with a number of apertures therein for receiving a plurality of eight pick-off exciter coils $28_e$, $28'_e$, $30_e$, $30'_e$, $32_e$, $32'_e$, $34_e$, $34'_e$, while there are attached to the rotor-and-motor assembly a corresponding plurality of pancake sensing coils $28_c$, $28'_c$, $30_c$, $30'_c$, $32_c$, $32'_c$, $34_c$, and $34'_c$, which are positioned in registry with the eight exciter coils when the gyroscope is assembled. In the interest of simplicity, all of the pick-off and sensing elements are not shown in FIG. 1 but are included in FIG. 4, to be hereinafter discussed. The eight exciter and sensing coils comprise a plurality of eight individual pick-off units 28 through 34 which, as will be hereinafter explained, are operable to generate sensing signals which represent the translational as well as angular deviation of the rotor-and-motor assembly relative to the null position.

Directing attention now to the structure and operation of the pick-off units, as is shown in FIG. 1, each of the pancake sensing coils are circular in configuration and fit into the pick-off exciter coil assembly. In connection with a more detailed discussion of the exciter coil assembly, attention is directed to FIG. 3 wherein there is shown a side cross-sectional view of a typical exciter coil assembly with the pancake coil positioned therein. As shown in FIG. 3, the exciter coil assembly includes a pair of C shaped low reluctance cores $38_a$ and $38_b$ positioned within a housing 40, each core having a winding wound thereon.

Considering now the operation of the overall pick-off unit, the windings wound on cores $38_a$ and $38_b$ are excited by an A.C. signal from an A.C. signal source, to be hereinafter discussed, whereby an electromagnetic field is developed which passes between the arms of the cores and hence the pancake coil. Accordingly, an A.C. sensing signal is induced in the pancake coil whose magnitude and phase is, of course, determined by the position of the pancake coil along the axes A–A'. For example, if the center of the pancake coil is positioned midway between the two arms of each of the C shaped cores $38_a$ and $38_b$, no resultant signal will be developed across the pancake coil. However, if the center of the pancake coil moves along the axes A–A' in the A' direction, the magnitude of the signal will be proportional to the departure of the center of the pancake coil from the mid-point and the signal will be in phase with the A.C. signal applied to the excitation coil. If, however, the pancake coil moves along the A–A' axes in the A direction, the magnitude of the signal will be proportional to the movement but the phase of the signal induced across the pancake coil will be 180° out of phase with the A.C. signal. Accordingly, the phase of the A.C. signal is indicative of the direction of movement of the rotor-and-motor assembly and the magnitude of the signal is representative of the movement of the rotor-and-motor assembly.

Continuing with the discussion of the invention, there is shown in FIG. 4 a servo circuit 27 which operates on the sensing signals to generate preselected D.C. signals 29, 31, and 33, whose voltages are related to the translational displacement of rotor-and-motor assembly 11 along the X', Y', and Z axes, respectively, in such a manner that upon application to the electrostatic pads, the rotor-and-motor assembly is returned to its null position. Circuit 27 is also responsive to the sensing signals from the pick-off units to generate three A.C. torquing signals 35, 37, and 39 which represent the angular deviation of rotor-and-motor assembly about the Y, Z, and X axes, respectively.

Referring now to FIG. 5, there is shown a cross-sectional fragmentary view of casing 13 and electrostatic pad 15 depicting the manner of mounting the four pads 15–21 to casing 13. As is shown in FIG. 5, pad 15 is mounted to the casing by means of a non-conductive jewel. As is further shown in FIG. 5, the radial positioning of the pad can be changed from the exterior of casing 13 by means of screw 81.

Referring now to pads 23 and 25, attention is directed to FIG. 6 wherein there is shown a fragmentary cross-sectional view depicting the manner of mounting these pads to covers 14 and 16. As is shown in FIG. 6, and as further indicated in FIG. 1, each of the pads are mounted to their respective covers by three non-conductive cylindrical jewels. As is further indicated in FIGS. 6 and 1, a leaf spring 83 is interpositioned between pad 23 and cover 14 in order to facilitate the positioning of the pads. In this regard, it should be noted that the radial spacing of the pads is extremely important since the distance between the pad surface and the grounded surface of the rotor-and-motor assembly determines the magnitude of the forces exerted on the rotor-and-motor assembly for any predetermined potential.

While numerous methods can be used to correctly position the electrostatic pads, one suitable method is to place a positioning ball within the gyroscope assembly rather than the rotor-and-motor assembly, the positioning ball having a radius greater than the rotor-and-motor assembly by the desired spacing between the pad and the surface of the rotor-and-motor assembly. Before the positioning ball is placed within the gyro, the area behind the pads should be filled with some suitable adhesive material such as an epoxy resin so that when pads 15–21 are positioned against the positioning ball, by turning screw 81, the resin will harden and the pads will be permanently positioned. As is shown in FIG. 1, pad 25 can be externally forced against the surface of the positioning ball through the aperture in cover 16. However, since pad 23 cannot be reached after assembly from outside the case, leaf spring 83 is used to force the pad against the positioning ball. It should be noted in this regard that leaf spring 83 should be so chosen that its spring force is not great enough to overcome the adhesive forces produced by the hardened resin.

As is apparent, after the adhesive resin has cured or hardened, the positioning ball is removed and the rotor-and-motor assembly positioned in the gyro whereby all of the pads will be correctly and permanently positioned.

Continuing further with the discussion of the invention, gyro 10 further includes a plurality of three pairs of torquers 41 and 41', 43 and 43', and 45 and 45', which are responsive to torquing signals 35, 37, and 39 for torquing rotor-and-motor assembly 11 about the XYZ axes to cancel out the deviation. Accordingly, the spin axis is maintained oriented along the X axis and assembly 11 can be oriented in any desired angular orientation along the Y and Z axes.

It should be noted in connection with torquing the rotor-and-motor assembly that while a torquing force couple applied about the X axis (spin axis) will cause the rotor-and-motor assembly to rotate about the X axis, as is well known to one skilled in the art, torquing the rotor-and-motor assembly about the Y axis will result in rotation of the assembly about the Z axis. Further, torquing the assembly about the Z axis will result in rotation of the assembly about the Y axis. Accordingly, torquing signals 35, 37, and 39 should be applied to torquer coils 45 and 45', 43 and 43', and 41 and 41', respectively, each of the torquer coil pairs 41 and 41', 43 and 43', and 45 and 45' being wound in opposite directions so that one exerts a pushing force on one side of rotor-and-motor assembly 11 while the other exerts a pulling force on the other side so that a pure force couple is applied to the assembly.

In connection with a detailed discussion of the structure of the torquers, it should be noted that numerous differing types of torquer structures suitable for use with the present invention are well known to those skilled in the art. In this regard, one especially suitable torquer is disclosed in U.S. Patent now Patent No. 3,078,723 entitled, "Miniaturized Temperature Insensitive Accelerometer" issued February 26, 1963 by Bruce A. Sawyer. Accordingly, the torques disclosed in FIGS. 1 and 2 are of the Sawyer type.

As is indicated in FIGS. 1 and 2, each torquer includes a torquer coil indicated in the figures by the subscript $c$ after the torquer number and a magnet (indicated by the subscript $m$ after the torquer number), casing 13 including apertures therein for receiving the three torquer coils while the three torquer magnets are fixed to the surface of rotor-and-motor assembly 11 in such a manner that the magnets and coils fit in register with one another when rotor-and-motor assembly 11 is positioned within casing 13.

In view of the foregoing, it should be clear that the pick-off units detect angular and translational movement of the rotor-and-motor assembly from the null position and transmit signals representative of such displacement to servo circuit 27. Servo circuit 27 then generates the preselected D.C. signals which are applied to the electrostatic pads to eliminate the translational deviation. In addition, the servo circuit generates the A.C. torquing signals which are applied to the torquing coils of the torquers for torquing the rotor-and-motor assembly to eliminate any angular displacement of the rotor-and-motor assembly from the null position.

Before turning with particularity to servo circuit 27, the nature of each of the sensing signals should first be discussed in detail. In this regard, it can be shown that the voltages generated by the pick-offs are dictated by the following equations:

$$V_{30} = K_{30}(L_1\theta_z + b\theta_x + y) \quad (1)$$
$$V_{30'} = K_{30'}(L_1\theta_z - b\theta_x - y) \quad (2)$$
$$V_{28} = K_{28}(L_2\theta_y + a\theta_x - z) \quad (3)$$
$$V_{28'} = K_{28'}(L_2\theta_y - a\theta_x + z) \quad (4)$$
$$V_{32} = K_{32}(L_2\theta_x + a\theta_y - z) \quad (5)$$
$$V_{32'} = K_{32'}(L_2\theta_x - a\theta_y + z) \quad (6)$$
$$V_{34} = K_{34}(L_1\theta_z - b\theta_y + x) \quad (7)$$
$$V_{34'} = K_{34'}(L_1\theta_z + b\theta_y - x) \quad (8)$$

Where $L_1$, $L_2$, $a$, and $b$ are the respective lever arms of the pick-offs, $K_{28}$ through $K_{34}$ are constants of proportionality and $\theta_x$, $\theta_y$, and $\theta_z$ are the angular deviations of the rotor-and-motor assembly about the X, Y, and Z axes, respectively.

As is apparent from the foregoing equations, the sum of the voltage signals from pick-offs 30 and 30' is proportional to the angular deviation of the rotor-and-motor assembly about the Z axis. In addition, it is clear that the summation of the voltages generated by pick-offs 28 and 28' and 32 and 32' are proportional to the angular deviation of rotor-and-motor assembly 11 about the Y and X axes, respectively. Furthermore, by properly combining equations 1 through 6 and 8, it can be shown that voltages proportional to the translation of the rotor-and-motor assembly along the X', Y' and Z axes are given by the following equations:

$$V_{x'} = (V_{34} - V_{30'}) - \frac{b}{2L_2}(V_{32} + V_{32'}) + \frac{b}{2L_2}(V_{28} + V_{28'}); \quad (9)$$

$$V_{y'} = -(V_{34} - V_{30}) - \frac{b}{2L_2}(V_{32} + V_{321})\frac{b}{2L_2}(V_{28} + V_{28'}) -; \quad (10)$$

and $$V_z = \frac{V_{32'} - V_{32}}{2} + (V_{28} + V_{28'})\frac{a}{2L_2} \quad (11)$$

Referring now with particularity to servo circuit 27, as is shown in FIG. 4, the servo circuit includes a logic circuit 47, a gating circuit 49, a rectifying circuit 51, a transformer circuit 48, and an A.C. signal source 53. As is apparent from an examination of FIG. 4, logic circuit 47 includes conventional analog circuitry for mechanizing Equations 9, 10 and 11 to produce signals $V_{x'}$, $V_{y'}$, and $V_z$ as well as three individual amplifiers 52, 54, and 56 for amplifying $V_{x'}$, $V_{y'}$, and $V_z$, respectively. In addition, logic circuit 47 includes circuitry for summing $V_{30}$ and $V_{30'}$ to produce A.C. torquing signal 37, $V_{28}$ and $V_{28'}$ to produce torquing signal 35 and $V_{32}$ and $V_{32'}$ to produce torquing signal 39.

Continuing with the discussion of the invention, as is shown in FIG. 4, the A.C. voltage signals $V_{x'}$, $V_{y'}$, and $V_z$ are applied to gate 49 along with the A.C. excitation signal from source 53 which, as has been heretofore mentioned, is applied to and used to excite the pick-off exciter coil. The gating circuit compares the phase of the A.C. voltage signals from logic circuit 47 with the phase of the excitation signal from source 53 and directs signals $V_{x'}$, $V_{y'}$, and $V_z$ over conductors 29 or 29', 31 or 31' and 33 or 33', respectively, in accordance with whether the signals are in phase or 180° out of phase with the excitation signal.

More particularly, as is shown in FIG. 4, gating circuit 49 includes a plurality of three pairs of gates $53_a$ and $53_b$, $55_a$ and $55_b$, and $57_a$ and $57_b$. The A.C. signal from the A.C. signal source is applied directly to gates $53_b$, $55_b$, and $57_b$ while the A.C. signal is applied to inverter 59 before being applied to gating circuits $53_a$, $55_a$, and $57_a$ so that an inverted A.C. signal is applied to these gating circuits.

As is further shown in FIG. 4, $V_{x'}$, $V_{y'}$, and $V_z$ are applied to gating circuits $53_a$ and $53_b$, and $55_a$ and $55_b$ and, $57_a$ and $57_b$, respectively. Accordingly, since the gating circuits operate as basic "and" gates, if the signals from logic circuit 47 are in phase with the A.C. signal from source 53, they will be passed by one of the "b" series gates while if they are 180° out of phase, they would be passed by the "a" series gates. In this manner, signals $V_{x'}$, $V_{y'}$, and $V_z$ are directed to the appropriate electrostatic pads to exert forces on the rotor-and-motor assembly for returning the assembly to its null position.

As shown in FIG. 4, the gated signals from logic circuit 47 are then applied to voltage step-up transformers within transformer circuitry 48 whereby the maximum peak-to-peak voltage of the gated signals is increased to a sufficient voltage to insure that the rotor-and-motor assembly will be returned to its null position. The stepped-up voltage signals are then applied to rectifying circuit 51 and rectified to take a substantially D.C. form whereby they are then applied directed to the appropriate electrostatic pads.

Continuing with the discussion of the invention, it should be pointed out that a larger magnitude voltage generally needs to be applied to the electrostatic pads when the gyro is initially turned on, than is required during normal operation. This is true since during the initial turn-on, the gyro is generally substantially removed from the center or null position and a considerable force is required to retain it to the null position along the axes aligned with the gravity vector.

In this regard, it should be noted that if it is desired to mechanize the gyroscope of the invention in such a manner that relatively small magnitude voltages can be utilized, a flotation fluid should be selected having a density within the range of the external gyro environmental temperature that is substantially greater than that of the rotor-and-motor assembly, but which is somewhat less than that of the rotor-and-motor assembly when the fluid is heated by the constant application of the electrostatic voltages to the electrostatic pads during the initial centering. Accordingly, the rotor-and-motor assembly will sink past the center or null position and thereby lock into position without the necessity of a large electrostatic potential.

It should also be noted that the gyroscope of the invention can be modified in many particulars as can the servo circuit. For example, the servo circuit can be mechanized so that rather than applying a valtage to only one of each pair of electrostatic pads, a voltage is applied simultaneously to all pads. Accordingly, the scope of the invention is to be limited only by the spirit and scope of the appended claims.

What is claimed as new is:

1. In a precision gyro, the combination comprising: a housing member; a substantially spherical rotor-and-motor assembly positioned within said housing member, said assembly having as spin axis; a flotation liquid filling said housing member and surrounding said rotor-and-motor assembly, the mass of the liquid displaced by said rotor-and-motor assembly being approximately equal to the mass of said assembly; electrostatic means for electrostatically positioning said assembly in said housing; and torquer means selectively operable to apply force couples to said rotor-and-motor assembly for precessing said rotor-and-motor assembly.

2. The combination defined in claim 1 wherein said electrostatic means includes a pair of diametrically opposed electrostatic plates positioned on said housing.

3. The combination defined in claim 2 wherein said electrostatic means further include two additional pairs of electrostatic plates, each pair of plates being positioned on the inside surface of said housing diametrically opposed relative to said rotor-and-motor assembly.

4. In a precision two-degree-of-freedom gyro, the combination comprising: a housing member; a spherical rotor-and-motor assembly positioned within said housing member, said assembly having a spin axis orthogonal to a pair of first and second mutually orthogonal sensing axes; a flotation fluid filling said housing member and surrounding said rotor-and-motor assembly, the mass of said fluid displaced by said rotor-and-motor assembly being approximately equal to the mass of said assembly; means for electrostatically centering said assembly in said housing; pick-off and torquer means operable to sense rotation of said assembly from a null position relative to said housing and to apply force couples to said assembly to return said assembly to the null position.

5. The combination defined in claim 4 wherein said pick-off and torquer means includes a first pair of pick-off and torquer units for sensing rotation of said assembly about said first axis and for torquing said assembly to cancel the rotation and a second pair of pick-off and torquer units for sensing rotation of said assembly about said second axis and for torquing said assembly to cancel the rotation.

6. The combination defined in claim 5 wherein said pick-off and torquer means further includes a third pair of pick-off and torquer units for sensing rotation of said assembly about said spin axis and for applying a torque to said assembly for nulling rotation about said spin axis.

7. In a precision gyro, the combination comprising: a gyro housing; a substantially spherical rotor-and-motor assembly, said assembly positioned within said housing; and having a spin axis; means for supporting said assembly free from physical support contact by the housing, said means including a flotation fluid surrounding said rotor-and-motor assembly; and including additional means exerting a levitation force on the assembly, and torquer means selectively operable for applying force couples to said rotor-and-motor assembly to rotate said assembly about said spin axes to maintain said spin axes aligned in a predetermined direction.

8. In a precision gyro, the combination comprising: a housing member; a rotor-and-motor assembly positioned within said housing member, said assembly having a spin axis; means for supporting said assembly free from physical support contact by the housing, said means including a flotation liquid filling said housing member and surrounding said rotor-and-motor assembly, the mass of the liquid displaced by said rotor-and-motor assembly being approximately equal to the mass of said assembly; and including additional means exerting a levitation force on the assembly, pick-off means positioned adjacent said rotor-and-motor assembly for generating a signal representative of the magnitude and direction of the rotation of said rotor-and-motor assembly about said spin axis; and torquer means positioned adjacent said rotor-and-motor assembly responsive to said signal for applying a torque to said rotor-and-motor assembly about said spin axis to null out the rotation of said rotor-and-motor assembly.

9. In a precision two-degree-of-freedom gyro, the combination comprising: a housing member; a spherical rotor-and-motor assembly positioned within said housing member, said assembly having a spin axis orthogonal to a pair of first and second mutually orthogonal axes; a flotation fluid filling said housing member and surrounding said rotor-and-motor assembly, the mass of said fluid displaced by said rotor-and-motor assembly being approximately equal to the mass of said assembly; pick-off means for sensing rotation of said rotor-and-motor assembly about said first, second, and spin axes from a predetermined angular orientation and for sensing translational movement of said rotor-and-motor assembly from a null position; a servo circuit coupled to said pick-off means and operable for generating first, second, and third signals representative of the translational movement of said rotor-and-motor assembly along said first, second, and spin axes, respectively, said servo means being further operable for generating fourth, fifth, and sixth torquing signals representative of the magnitude of the rotation of said rotor-and-motor assembly about said first, second, and spin axes, respectively; first electrostatic means positioned on said housing and responsive to said first signal for generating an electrostatic field exerting a force on said rotor-andmotor assembly tending to cancel out the translational movement of said rotor-and-motor assembly along the first axis; second electrostatic means positioned on said housing adjacent said rotor-and-motor assembly and responsive to said second signal for generating an electrostatic field exerting a force on said rotor-and-motor assembly tending to cancel out the translational movement of said rotor-and-motor assembly along the second axis; third electrostatic means positioned on said housing adjacent said rotor-and-motor assembly and responsive to said third signal for generating an electrostatic field exerting a force on said rotor-and-motor assembly tending to cancel out the translational movement of said rotor-and-motor assembly along the spin axis; torquer means coupled to said servo circuit and positioned adjacent said rotor-and-motor assembly for torquing said rotor-and-motor assembly about said first, second, and spin axes in accordance with said fourth, fifth, and sixth signals, respectively, to cancel out the angular rotation of said rotor-and-motor assembly whereby said rotor-and-motor assembly is maintained in said predetermined angular orientation.

10. The combination defined in claim 9 wherein each of said first, second, and third electrostatic means includes a pair of first and second electrostatic pads positioned on opposite sides of said rotor-and-motor assembly along said first, second, and spin axes, respectively.

11. The combination defined in claim 10 wherein said servo circuit is connected to each of said first and second electrostatic pads and includes gating elements for selectively applying said first, second, and third signals selectively to one or the other of said first and second pads of said first, second, and third electrostatic means, respectively.

12. In a precision gyro, the combination comprising: a housing member; a spherical rotor-and-motor assembly positioned within said housing member, said assembly having a spin axis orthogonal to a pair of first and second mutually orthogonal axes; a flotation fluid filling said housing member and surrounding said rotor-and-motor assembly, the mass of said fluid displaced by said rotor-and-motor assembly being approximately equal to the mass of said assembly; first, second, and third pick-off means positioned adjacent said rotor-and-motor assembly and operable for generating first, second, and third sensing signals, respectively, said first, second, and third sensing signals being representative of both the rotation from a predetermined angular orientation of said rotor-and-motor assembly about said first, second, and spin axes, respectively, and the translational movement of said rotor-and-motor assembly from a null position along said first, second, and spin axes, respectively; a logic circuit coupled to said first, second, and third pick-off means, said logic circuit operating on said first, second, and third sensing signals to produce fourth, fifth, and sixth torquing signals representative of the angular rotation of said rotor-and-motor assembly about said first, second, and spin axes, respectively, said logic circuit further including apparatus to produce fourth, fifth, and sixth centering signals representative of the translational movement of said rotor-and-motor assembly about third, fourth, and spin axes, respectively, said third and fourth axes being in the plane defined by said first and second axes and being displaced therefrom by a predetermined angular increment; first, second, and third electrostatic means responsive to said fourth, fifth, and sixth centering signals for forcing electrostatically said rotor-and-motor assembly along said third, fourth, and spin axes, respectively, to return said rotor-and-motor assembly to the null position; and torquing means positioned adjacent said rotor-and-motor assembly and responsive to said first, second, and third torquing signals for torquing said rotor-and-motor assembly about said first, second, and spin axes to return said rotor-and-motor assembly to the predetermined angular orientation.

References Cited by the Examiner
UNITED STATES PATENTS 2,933,925   4/60   Singleton et al. _____ 74—5 X
3,003,356   10/61  Nordsieck _____ 74—5

BROUGHTON G. DURHAM, *Primary Examiner.*